United States Patent
Joffe et al.

(10) Patent No.: US 12,500,861 B2
(45) Date of Patent: Dec. 16, 2025

(54) RESOLVING DOMAIN NAME SYSTEM (DNS) REQUESTS VIA PROXY MECHANISMS

(71) Applicant: Vercara, LLC, Sterling, VA (US)

(72) Inventors: Rodney Lance Joffe, Tempe, AZ (US); David Link King, Cave Creek, AZ (US)

(73) Assignee: DigiCert, Inc., Lehi, UT (US)

( * ) Notice: Subject to any disclaimer, the term of this patent is extended or adjusted under 35 U.S.C. 154(b) by 140 days.

(21) Appl. No.: 18/535,480

(22) Filed: Dec. 11, 2023

(65) Prior Publication Data

US 2024/0214346 A1    Jun. 27, 2024

Related U.S. Application Data

(63) Continuation of application No. 17/937,937, filed on Oct. 4, 2022, now Pat. No. 11,902,243, which is a continuation of application No. 15/805,075, filed on Nov. 6, 2017, now Pat. No. 11,463,400.

(60) Provisional application No. 62/417,807, filed on Nov. 4, 2016.

(51) Int. Cl.

| | |
|---|---|
| *H04L 61/4511* | (2022.01) |
| *H04L 61/4552* | (2022.01) |
| *H04L 61/59* | (2022.01) |
| *H04L 67/56* | (2022.01) |
| *H04L 101/618* | (2022.01) |

(52) U.S. Cl.
CPC ...... *H04L 61/4511* (2022.05); *H04L 61/4552* (2022.05); *H04L 61/59* (2022.05); *H04L 67/56* (2022.05); *H04L 2101/618* (2022.05)

(58) Field of Classification Search
CPC . H04L 61/4511; H04L 61/4552; H04L 61/59; H04L 67/56; H04L 2101/618
See application file for complete search history.

(56) References Cited

U.S. PATENT DOCUMENTS

| | | |
|---|---|---|
| 5,805,820 A | 9/1998 | Bellovin et al. |
| 9,172,713 B2 | 10/2015 | Joffe et al. |
| 11,463,400 B2 | 10/2022 | Joffe et al. |
| 2003/0182447 A1* | 9/2003 | Schilling ................ H04L 69/40 709/245 |
| 2005/0044234 A1 | 2/2005 | Coughlin et al. |
| 2008/0086574 A1 | 4/2008 | Raciborski et al. |
| 2013/0262637 A1 | 10/2013 | Weaver et al. |
| 2014/0351413 A1 | 11/2014 | Smith et al. |
| 2015/0163158 A1 | 6/2015 | Ryland |

(Continued)

*Primary Examiner* — Lesa M Kennedy
(74) *Attorney, Agent, or Firm* — Baratta Law PLLC; Lawrence A. Baratta, Jr.

(57) ABSTRACT

Systems and methods are described herein for providing proxy mechanisms for DNS services, such as resolving DNS requests. In some embodiments, the systems and methods establish a Proxy DNS module at a DNS resolver of an internet service provider, and access, with the proxy DNS module, DNS queries destined for a public name server. The name server may be accessible by the DNS resolver via a publically-accessible network. Further, the systems and methods may route the accessed DNS queries to a private name server associated with the proxy DNS module and accessible via a private communications channel, and receive, from the private name server and via the private communications channel, IP addresses associated with the DNS queries.

17 Claims, 6 Drawing Sheets

(56) References Cited

U.S. PATENT DOCUMENTS

2016/0316006 A1 10/2016 Zhang et al.
2017/0104714 A1 4/2017 Naidu et al.
2017/0118250 A1 4/2017 Phillips
2018/0131665 A1 5/2018 Joffe et al.
2023/0102361 A1 3/2023 Joffe et al.

* cited by examiner

RESOLVING DOMAIN NAME SYSTEM (DNS) REQUESTS VIA PROXY MECHANISMS

CROSS REFERENCE TO RELATED APPLICATIONS

This application is a continuation of U.S. patent application Ser. No. 17/937,937, filed on Oct. 4, 2022, which is a continuation of U.S. patent application Ser. No. 15/805,075, filed on Nov. 6, 2017, which claims priority to and benefit from U.S. Provisional Patent Application No. 62/417,807, filed on Nov. 4, 2016. The contents of each application is incorporated by reference in its entirety herein.

BACKGROUND

A domain name system (DNS) performs a variety of different functions, including acting as a directory service for IP addresses by translating domain names to their associated numerical IP addresses. In order to perform such functions, a typical DNS provides authoritative name servers, which publish information about domains and return definitive answers to name queries, and client-side resolvers, which perform recursive and/or non-recursive queries of the name servers for client devices, such as user computers, to resolve the queries.

For example, in response to receiving a DNS query from a user (e.g., the user enters a uniform resource location (URL) in a browser), the user's computer, via the browser, may first search a cache associated with the browser for the domain name of the URL. When the browser cache cannot resolve the DNS query, the browser, via an associated DNS resolver, sends the DNS query to a recursive DNS resolver of the internet service provider (ISP) providing the Internet connection to the user's computer.

After receiving the DNS query, the recursive DNS resolver will search a local cache for information that resolves the DNS query. When the local cache of the ISP cannot resolve the DNS query, the DNS resolver performs a recursive DNS search of various root name servers, top-level domain (TLD) name servers, and/or authoritative name servers to resolve the DNS query. The results (e.g., IP addresses for queried domain names) are then returned by the DNS resolver to the browser of the user's computer, which received the initial request.

In conventional systems, the DNS resolver may communicate with the root name servers, TLD name servers, and/or the authoritative name servers via the Internet or via one or more publically accessible network devices (e.g., routers). Thus, communications performance between the DNS resolver and various name servers may be negatively affected by factors that may be out of the ISP's control. For example, a publically accessible router connecting the DNS resolver with an authoritative name server may be under a distributed denial-of-service (DDOS) attack and become unavailable. In another example, a publicly accessible router connecting the DNS resolver with a TLD name server may become overloaded with genuine network traffic (e.g., video streaming during prime time). In yet another example, a publicly accessible router connecting the DNS resolver with a root server may be taken offline without notice to the ISP (e.g., for maintenance).

BRIEF DESCRIPTION OF THE DRAWINGS

Embodiments of the disclosed technology will be described and explained through the use of the accompanying drawings.

Figure 1:
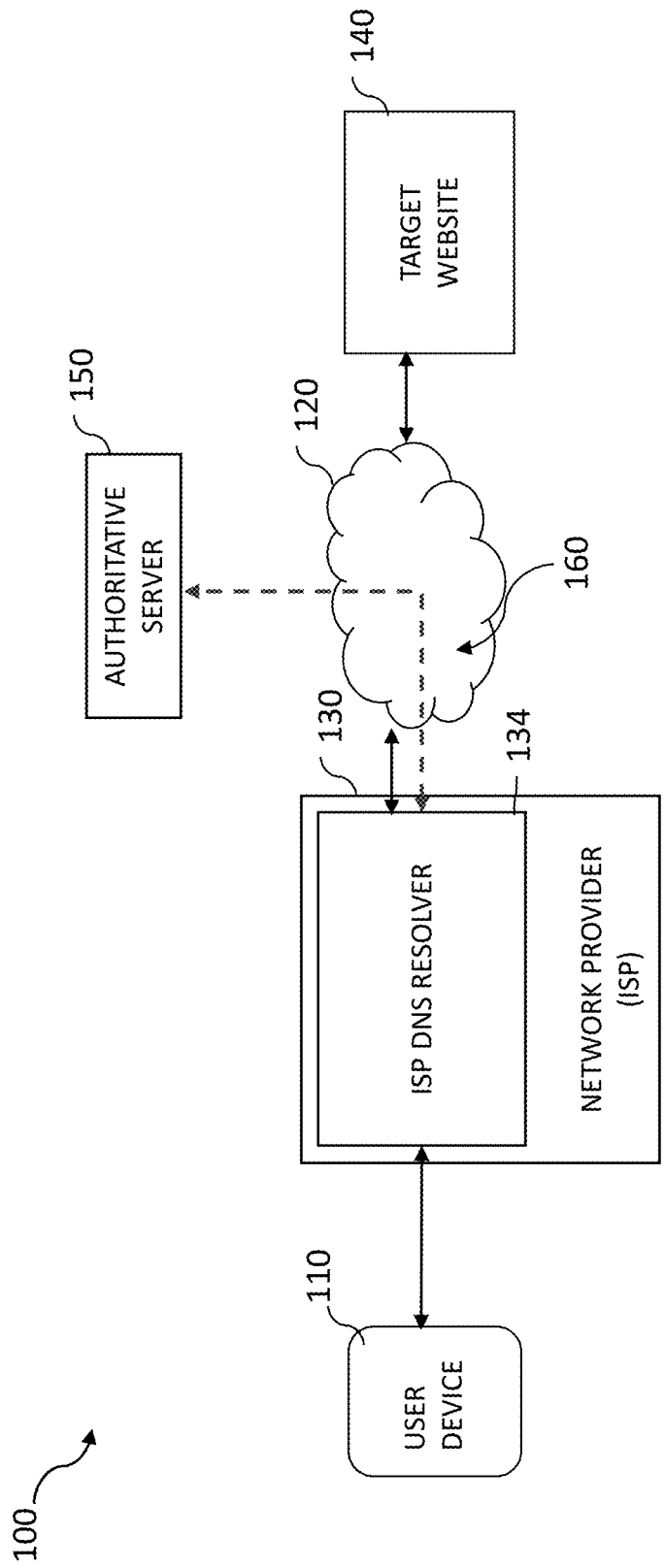
FIG. 1 is a block diagram illustrating a conventional computing environment for handling DNS queries via publically accessible networks.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for providing proxy mechanisms for DNS services, such as resolving DNS requests. In some embodiments, the systems and methods establish a proxy DNS module at a DNS resolver of an internet service provider. Further, the systems and methods may access, with the established Proxy DNS module, domain name requests destined for a name server that may be accessed via a publically accessible network. The domain name request may be transmitted, or prepared for transmission, by the DNS resolver of the ISP. Subsequently, systems and methods may route the accessed name requests to a private name server that is associated with the proxy DNS module, and return, from the private name server, IP addresses associated with the requested domain names or IP addresses associated with other name servers such as top-level domain (TLD) name servers and authoritative name servers for the requested domain names.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

As described herein, the systems and methods provide various proxy mechanisms within domain name system (DNS) architectures. As described herein, the systems access and/or intercept DNS requests destined for a name server (e.g., root name server, top-level domain name server, and/or authoritative name servers) that can be accessed via a publically accessible network (e.g., the Internet). The accessed and/or intercepted DNS requests may be sent to an alternative name server via a secure proxy mechanism.

As an example, FIG. 1 depicts the handling of DNS queries using conventional methods. As depicted, a user device 110 communicates with an ISP 130, which facilitates access by the user device 100 to the Internet 120. The user device 100, via the Internet 120, may attempt to access various websites and other content, such as content provided by a target website 140.

In order to access the target website 140, the user device, via input provided by a user (e.g., a URL or other domain name), sends a request to the ISP to access the target website 140. The ISP, having the URL, attempts to identify the IP address for the domain name of the target website 140 by performing various DNS transactions. After attempting to identify the IP address via cached information, the ISP employs its own DNS resolver 134 to return an IP address to the user device. The ISP DNS resolver 134 sends a query 160 to an authoritative server 150 over the Internet 120, which searches for the associated IP address, and returns the address to the ISP DNS resolver 134. The ISP DNS resolver 134 then sends the IP address to the user device 110, which uses the IP address to access the target website 140. In some situations, an IP address of the authoritative server 150 for the domain name may not be known to the ISP DNS resolver. In these situations, ISP DNS Resolver 134 may send the DNS query a TLD name server for the TLD of the domain name to receive one or more IP addresses of authoritative name server(s) for the domain name. If an IP address of a TLD name server is not known to the ISP DNS resolver, ISP DNS resolver 134 may send the DNS query to a root name server to receive IP addresses of TLD name servers for the domain name.

This conventional method of performing DNS transactions introduces a variety of drawbacks associated with the speed of resolving requests and the security of communications between components. For example, the ISP DNS resolver 130 may introduce delays in resolving DNS requests when querying remote and/or third party name servers (e.g., root name servers, TLD name servers, authoritative name servers) over the Internet 120. Such delays may result from, for example, a distributed denial-of-service (DDOS) attack on a publically accessible component (e.g., a router) in the path of the communications between the ISP DNS resolver 130 and the remote/third party name servers. In another example, a publicly accessible router connecting the DNS resolver with a TLD name server may become overloaded with genuine network traffic (e.g., video streaming during prime time) thereby causing the delay. In yet another example, a publicly accessible router connecting the DNS resolver with a root server may be taken offline without notice to the ISP (e.g., for maintenance) thereby preventing the ISP DNS resolver 130 from resolving the DNS requests.

The systems and methods disclosed herein, therefore, seek to mitigate and/or avoid such issues by providing proxy or intermediate components within ISPs and other networks. These proxy or intermediate components are configured to prevent DNS transaction communications from being routed through a publically-accessible network (as depicted in FIG. 1), such as the Internet 120, and, instead redirect or handle DNS resolution via secure and/or private communication channels. Thus, in some embodiments, the systems and methods employ proxy mechanisms to perform DNS transactions for user devices 110 without exposing the DNS queries and responses to publically-accessible networks, and/or without causing ISPs 130 and other network providers to modify their network or component architectures, among other benefits.

Figure 2A:
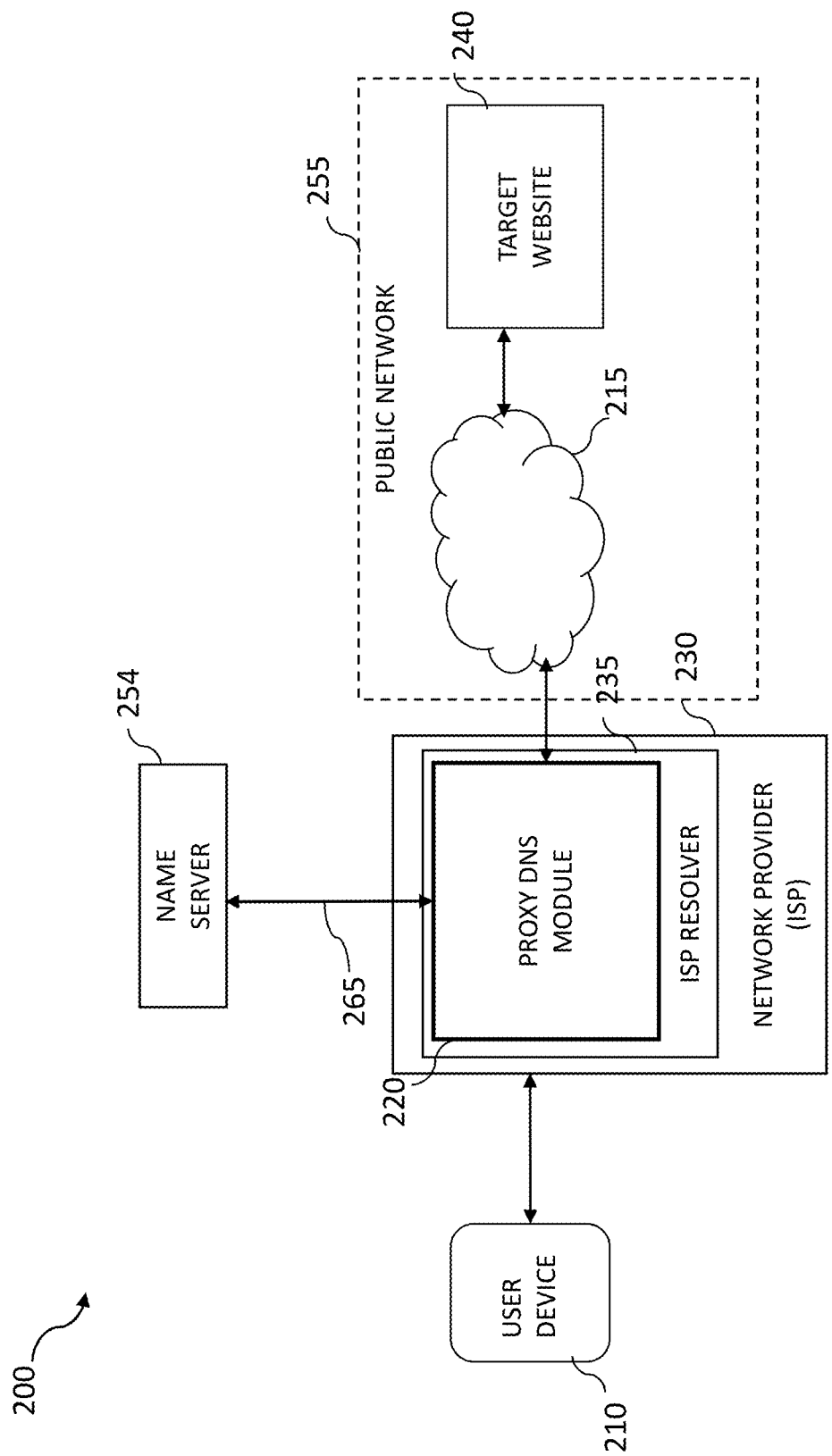
FIGS. 2A-2B are block diagrams illustrating a computing environment for handling DNS queries using proxy mechanisms and/or within private networks.

Therefore, in some embodiments, the systems and methods provide network providers, such as ISPs, with components configured to access and resolve DNS requests received by the network providers within controlled and/or secure computing environments. FIG. 2A is a block diagram illustrating a suitable computing environment 200 for handling DNS queries using proxy mechanisms.

A user device 210, such as a computer, laptop, mobile device, or other computing system, may receive input (e.g., a uniform resource locator (URL)) from a user to access a website, such as a target website 240 that serves content to the user or is otherwise accessible by the user of the device 210.

In order to access the website 240, the user device 210 transmits DNS requests to retrieve IP addresses associated with domain names of input URLs, which may be received by the ISP resolver 235 of an internet service provider (ISP) 230. The ISP 230 may provide the Internet 215 and other network services to the user device 210. Further, the ISP 230 may include various components configured to connect the user device 210 with the Internet 215 (or other networks), such as packet switching components, path selection components, network interface components, and so on. In response to receiving DNS requests, the ISP resolver 235 may perform various DNS services (e.g., recursive searches of name services).

The systems and methods described herein provide a proxy DNS module 220 within the ISP resolver 235. The proxy DNS module 220 is configured to route and/or redirect DNS requests that may be destined for a name server accessible via a publically-accessible network (e.g., the Internet) to another name server 254 accessible via a secure communication channel 265. The name server 254 may be one of: one or more root name servers, one or more TLD name servers for the TLD of the domain name in the DNS request, and/or one or more authoritative name servers for the domain name in the DNS request.

In one example, the ISP resolver 235 may forward, or attempt to forward, the DNS request to a known authoritative server for the domain name included in the DNS request. The known authoritative server may be accessible via the Internet. Thus, in this example, the proxy DNS module 220 may access and/or intercept the DNS request and route the DNS request instead to the name server 254 that may be also be an authoritative server for the domain name included the DNS request. But, in contrast to the known authoritative server, the DNS request may be transmitted to the name server 254 using a secure communications channel 265. In response, the name server 254 may send IP addresses that are associated with the domain name included in the DNS request to the ISP resolver via the proxy DNS module 220 and the secure communication channel 265.

In another example, the ISP resolver 235 may attempt to forward the DNS request to a known root name server or a TLD name server for the TLD of the domain name included in the DNS request. The root name server or the TLD name server may be accessible via the Internet. In this example, the proxy DNS module 220 may access and/or intercept the DNS request and route the DNS request instead to name server 254 that may also be a root name server or the TLD name server the TLD of the domain name included in the DNS request. The DNS request may be routed to name server 254 via a secure communication channel 265. In response, the name server 254 may send IP addresses that are associated with TLD name servers and/or authoritative DNS servers to the ISP resolver via the proxy DNS module 220 and the secure communication channel 265.

The secure communication channel 265 may be a secure tunnel provided by a variety of different tunneling mechanisms that may be established and/or initiated between the proxy DNS module 220 and the name server 254. In some embodiments, the secure communication channel 265 may be formed via network components that are part of a private network (e.g., privately owned routers that cannot be accessed by the public). In some embodiments, the communication channel 265 may be formed using verification and authentication components/appliance described in U.S. Pat. No. 9,172,713, entitled SECURE DOMAIN NAME SYSTEM, which is incorporated by reference in its entirety.

Furthermore, the name server 254 may be one or more servers at locations suitable for forming the secure communication channel 265. In some embodiments, the name server 254 may be a part of a private network 250 that may not be accessible by the public.

Therefore, the system employs a proxy mechanism (e.g., proxy module 220) within the ISP 230 or other network provider to prevent DNS requests from being transmitted to a name server via a publically accessible network, such as the Internet. Thus, the proxy module 220 may enable the DNS requests and responses that are transmitted and received by DNS servers (e.g., ISP resolver 135) of the ISP 230 to avoid exposure to publically-accessible networks, which may be susceptible to performance degradation and/ or unpredictable availability.

Figure 2B:
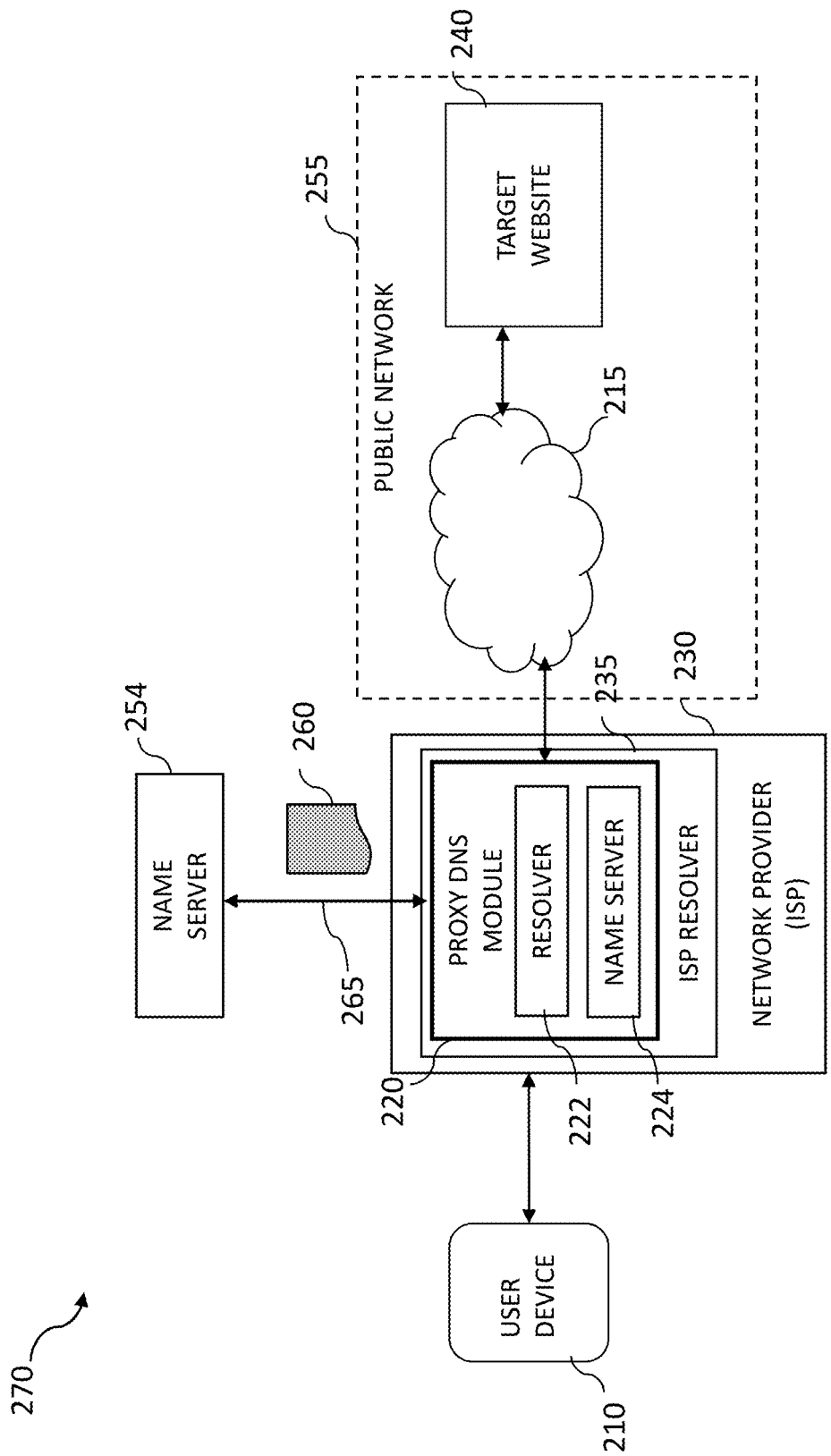

As shown in FIG. 2B, in some embodiments, the various DNS services may be performed to resolve the received DNS requests at the proxy DNS module 220. For example, a local DNS resolver 222 may be included in the proxy DNS module 220 and perform various recursive or non-recursive DNS searches of the names server(s) 224 within the proxy module 220. For example, the proxy DNS module 220 may include a "light" or local version of a name server 224 that includes information in a master file or other database used to resolve DNS requests. The proxy DNS module 220, via one or more secure, established tunnels 265, may receive updates 260 to the master file with new or changed information in response to previous queries.

FIGS. 2A-2B and the discussion herein provide a brief, general description of the components of the computing environments 200 and 270. Although not required, aspects of the computing environments 200 and 270 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, (e.g., smart phones), multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the environments 200 and 270 can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the environments 200 and 270 may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the user device 210 may include network communication components that enable the devices to communicate with remote servers or other portable electronic devices by transmitting and receiving wireless signals using a licensed, semi-licensed, or unlicensed spectrum over communications network, such as the network 120.

In some cases, the communication network 220 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

The communications network 220 may also include third-party communications networks such as a Global System for Mobile (GSM) mobile communications network, a code/ time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), Voice over LTE (VOLTE) network, or other communications network. Further, the communications network 120 may include or be part of a wireless communications network, such as an Internet Multimedia System (IMS) network or other wireless networks.

Examples of the DNS Proxy Mechanism

Figure 3:
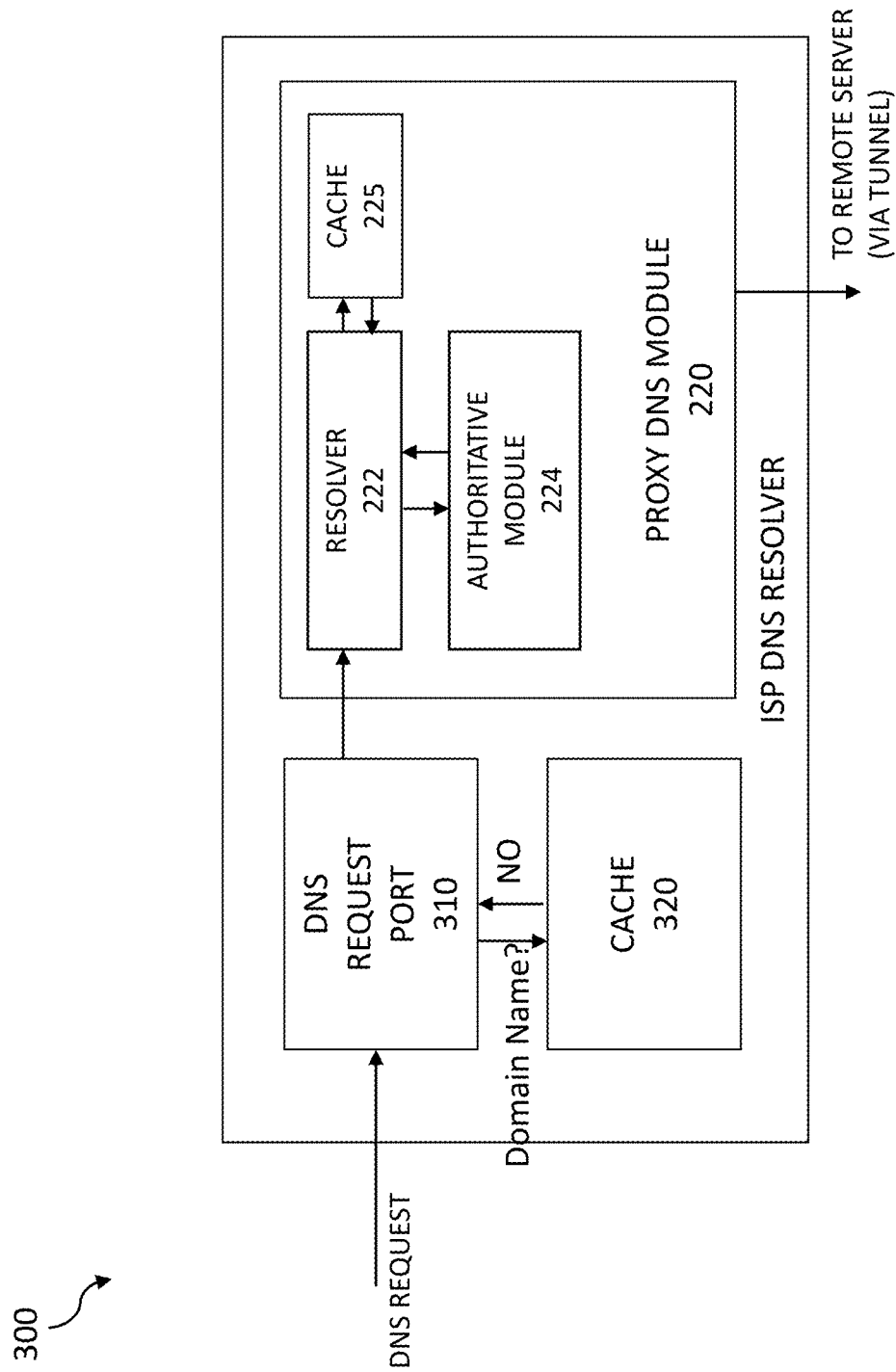
FIG. 3 is a block diagram illustrating the components of an ISP DNS resolver with proxy DNS query routing.

As described herein, the proxy DNS module 220 intercepts or otherwise accesses DNS requests that may be destined for a name server accessible via a publically accessible network, and routes or directs the DNS requests to local, remote, or private DNS resolvers or name servers, which resolve the requests. FIG. 3 is a block diagram illustrating the components of an ISP router 300 with proxy and/or intercepted DNS query routing.

The proxy DNS module 220, which performs the query routing, may include functional modules or systems that are implemented with a combination of software (e.g., executable instructions, or computer code) and hardware (e.g., at least a memory and processor). Accordingly, as used herein, in some examples a module or system is a processor-implemented module, system, or set of code and represents a computing device having a processor that is at least temporarily configured and/or programmed by executable instructions stored in memory to perform one or more of the particular functions that are described herein.

As shown in FIG. 3, a DNS request (e.g., including a domain name included in an input URL) is received within the ISP router 200 via a preconfigured communication port 310. For example, DNS requests may be received via a transport layer over the transmission control protocol (TCP) and/or the user datagram protocol (UDP) at system port 53 of the ISP router 300.

In some cases, the DNS resolver 300 first queries a local cache 320 associated with the router to determine whether information stored by the cache (e.g., information that includes previous resolved domains) is sufficient to resolve the DNS request. When the cached information can resolve the request (e.g., the cache includes the input domain name and associated IP address), the DNS resolver extracts the IP address and returns the information to a requesting device. When the cached information does not include the requested domain name, the DNS resolver 300 may send or attempt to send a DNS request to one or more known name servers to obtain IP addresses of TLD name servers for the TLD of the requested domain name, authoritative name servers of the requested domain name, and/or the requested domain name. Such name servers may be accessible via a publically accessible network, such as the Internet. The proxy DNS module 220 intercepts or otherwise accesses the request (while also causing the router 300 to terminate, end, or prevent local processes that may attempt to locally resolve the request). In some cases, the proxy DNS module 220 may intercept the request before the cache is queried. In some embodiments, the proxy DNS module 220 may intercepts or otherwise accesses the request before the request is sent. Alternatively, the proxy DNS module 220 may intercept or otherwise access the request after the request is transmitted.

The proxy DNS module 220 routes or directs the accessed DNS request to the name server 254. In some cases, the proxy DNS module 220 may route or direct the accessed DNS request to a local cache 225, local resolver 222, and/or authoritative or name server module 224 within the proxy module 220. In these cases, the local resolver 222 performs DNS services (e.g., recursive searches of the authoritative server 224), and returns IP addresses to the requesting devices that resolve the DNS requests received from the devices.

As described herein, in some embodiments, the proxy DNS module 220 is connected or provided within the ISP without changes being made to the network and/or its components. A variety of different components may provide the proxy DNS module 220, such as components associated with the authoritative name server 254 and/or provided by the ISP 230. The following are example implementations and/or configurations of the proxy module 220 and/or various aspects of the proxy module 220:

A stand-alone box or server that is connected to one or more DNS servers or routers of the internet service provider;

A virtual machine having an instance located within one or more DNS servers of the internet service provider;

A network address translation (NAT) server associated with one or more DNS servers of the internet service provider, where the NAT forwards DNS requests to the DNS servers; and so on.

Figure 4:
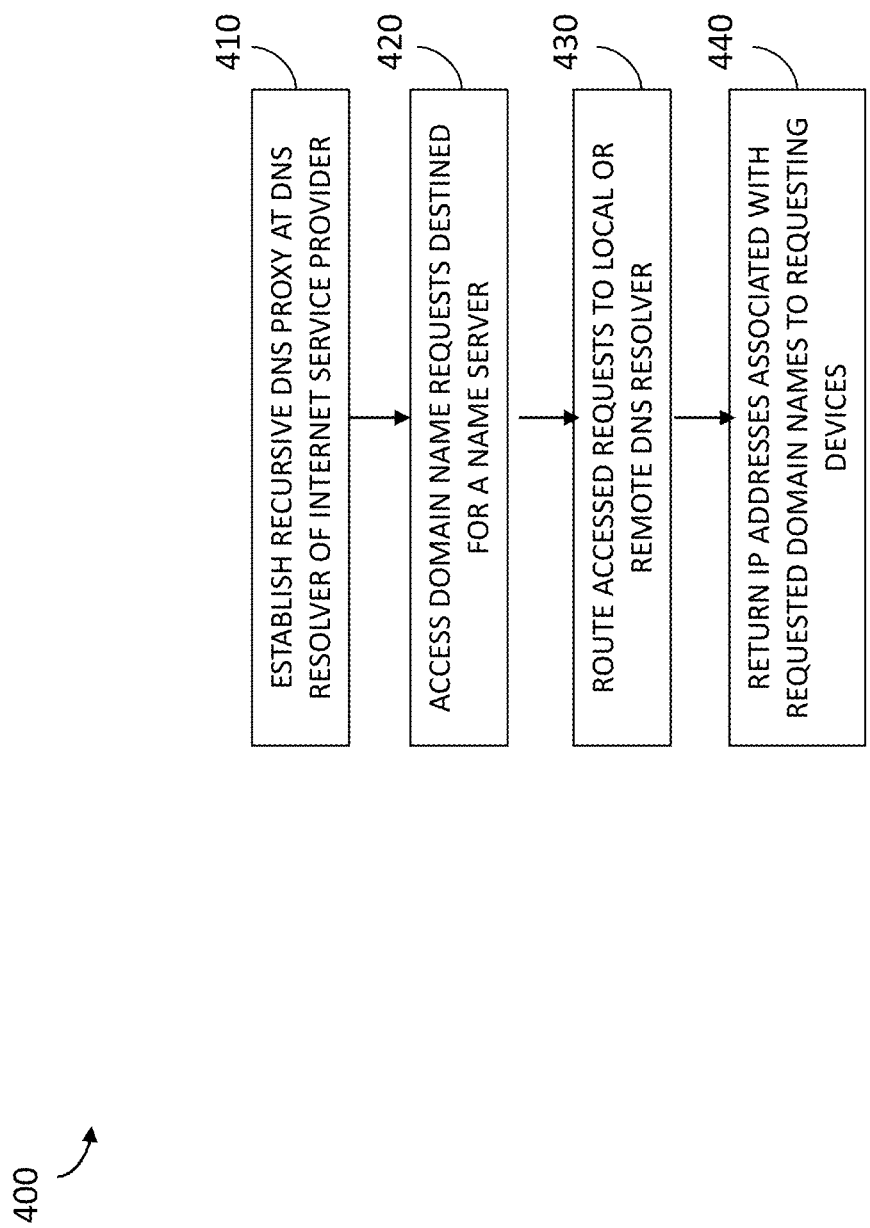
FIG. 4 is a flow diagram illustrating a method for performing a recursive DNS search using a proxy DNS module.

As described herein, the systems and methods perform various DNS services locally within ISP components that received DNS requests. FIG. 4 is a flow diagram illustrating a method 400 for performing a recursive DNS search using the proxy DNS module 220. Aspects of the method 400 may be performed by the proxy DNS module 220 and, accordingly, is described herein merely by way of reference thereto. It will be appreciated that the method 400 may be performed on any suitable hardware.

In operation 410, the system establishes a proxy DNS module at a DNS resolver of an internet service provider. For example, the proxy DNS module 222 may be contained by the ISP resolver 235 within the ISP 230.

In operation 420, the proxy DNS module 220 accesses DNS requests destined for a name server that can be accessed via a publically accessible network. For example, the proxy DNS module 220 may access the DNS request that are transmitted, or will be transmitted, by the DNS resolver 235 and destined for a name server (e.g., root name server, TLD name server, or an authoritative name server) accessible via the Internet.

In operation 430, the proxy DNS module 220 routes the accessed DNS requests to a local (or, remote) DNS resolver that is associated with the proxy DNS module 220. For example, the proxy DNS module 220 may identify a subset of the accessed DNS requests that are not resolved by the local cache 320 associated with the DNS resolver of the internet service provider, and route the identified subset of the accessed DNS requests to the local DNS resolver 222, which performs recursive searches on the local authoritative server 224 for IP addresses that resolve the URL requests.

In some cases, the proxy DNS module 220 establishes a secure tunnel between the module 220 and a remote name server 254 using one or more secure tunneling protocols, such as IPsec, Generic Routing Encapsulation (GRE) tunneling, and so on. Using the secure tunnel, the proxy module 220 may receive a master file of DNS records from the remote name server 254, and store the master file of DNS records within the local name server 224 within the proxy DNS module.

In some cases, the proxy module 220 may receive, from the remote name server 254, one or more DNS record updates via the secure tunnel, and store the one or more DNS record updates to a master file of DNS records stored within the local authoritative server 224. The proxy module 220, therefore, may utilize the secure tunnel 265 to receive information from the remote name server 254 and update, on a periodic basis, the records within the local (e.g., "light" version) server 224. The local server 224, therefore, may provide a subset of information stored by the authoritative server 254, and may periodically and/or dynamically modify the locally stored information when resolved DNS requests.

During or after the DNS requests are routed to the local DNS resolver 222, the proxy DNS module 220 may terminate local DNS transactions performed for the routed URL requests by the DNS resolver 235 of the internet service provider.

In some cases, the proxy DNS module 220 may route the accessed DNS requests to a DNS resolver or name server at a geographical location that is associated with a remote DNS resolver specifically provided for the internet service provider. For example, the proxy DNS module 220 may identify a subset of the accessed DNS requests that include one or more specific domain names (e.g., are requests associated with a specific website, content provider, and so on), and only route the identified subset of the accessed DNS requests to the remote DNS resolver 280, which performs recursive searches for IP addresses that resolve the DNS requests having the one or more specific domain names.

In operation 440, the proxy module 220 returns IP addresses associated with the requested domain names to the requesting devices. For example, the local DNS resolver 222 performs recursive searches of the information stored by the authoritative server 224 in order to resolve the domain names within the DNS requests.

As described herein, the proxy DNS module 220 facilitates the execution of DNS services within private or publically inaccessible networks (e.g., private network 250 or within local components), preventing DNS requests from traversing publically accessible (and often compromised) networks, such as public network 255, in order to be resolved.

Figure 5:
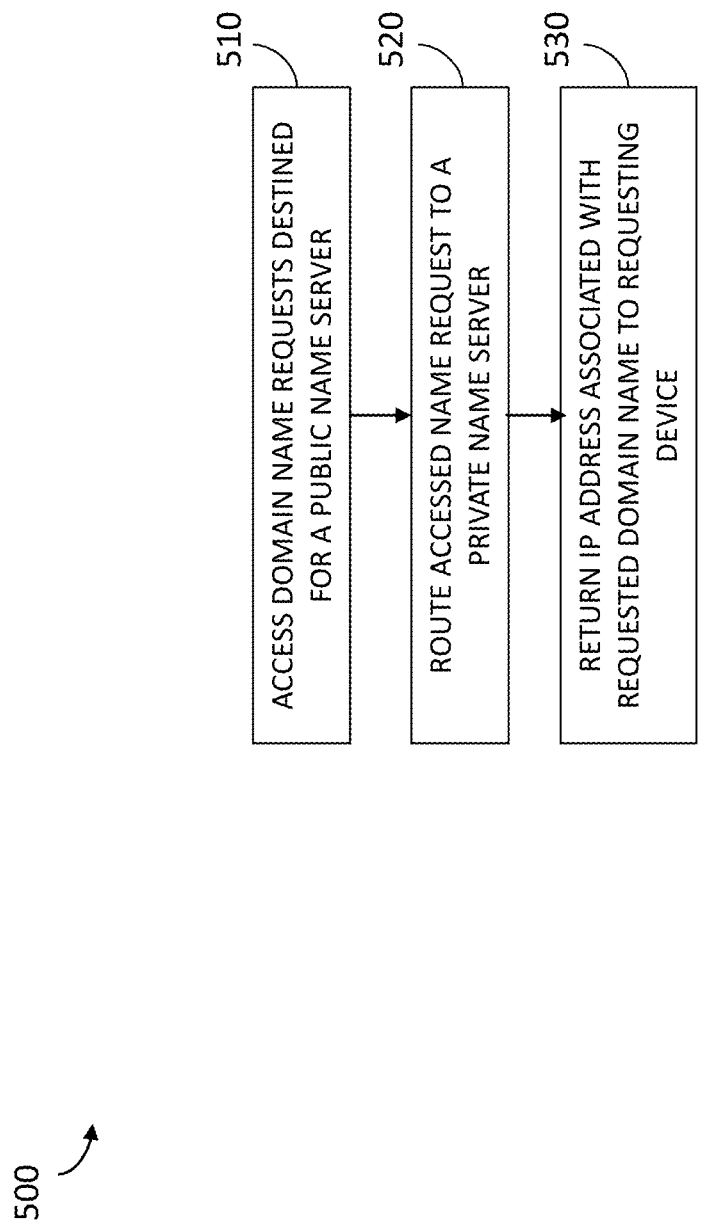
FIG. 5 is a flow diagram illustrating a method for performing recursive DNS searches within private network locations.

FIG. 5 is a flow diagram illustrating a method 500 for performing recursive DNS searches within private network locations. Aspects of the method 500 may be performed by the proxy DNS module 220 and, accordingly, is described herein merely by way of reference thereto. It will be appreciated that the method 500 may be performed on any suitable hardware.

In operation 510, the proxy DNS module 220 intercepts or otherwise accesses DNS requests destined for a public name server that can be accessed via a publically accessible network. For example, the proxy DNS module 220 may access the DNS request that are transmitted, or will be transmitted, by the DNS resolver 235 and destined for a name server (e.g., root name server, TLD name server, or an authoritative name server) accessible via the Internet.

In operation 520, the proxy DNS module 220 routes the accessed DNS requests to a private name server associated with the proxy DNS module 220 and accessible via a secure communication channel.

In operation 530, the name server 254 returns IP addresses associated with the requested domain names.

Therefore, the systems and methods, via the proxy DNS module 220, facilitate local or private resolution of DNS requests received into ISP networks by providing proxy and redirection of the received requests, which prevent the requests from entering a public network.

Thus, in some embodiments, the systems and methods facilitate the execution and performance of DNS services within private or inaccessible networks, reducing risk associated with low performance and/or attack vulnerabilities when the DNS performances are performed via public, unsecure networks (e.g., networks where DNS requests may be intercepted), among other benefits. Further, the local handling of requests provide more efficient and timely resolution of requests for users.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims

We claim:

1. A computer-implemented method of operating an internet service provider (ISP) domain name server (DNS) resolver, the computer-implemented method comprising:
   receiving, via a communication port, a DNS request;
   querying, by one or more computing devices of the ISP DNS resolver, a local cache of the ISP DNS resolver to determine whether information stored by the local cache is sufficient to resolve the DNS request;

if the information stored is sufficient to resolve the DNS request:
  extracting internet protocol (IP) addresses of top level domain (TLD) name servers of a TLD of a requested domain name from the DNS request from the local cache; and
  returning the IP addresses to a requesting device;
if the information stored is not sufficient to resolve the DNS request:
  sending the DNS request to a second local cache, a local resolver, or a server of the ISP DNS resolver to perform DNS services locally;
  after sending the DNS request to the second local cache, the local resolver, or the server within the ISP DNS resolver, intercepting the DNS request, ending local processes from locally resolving the DNS request, and sending the DNS request to one or more known remote name servers to obtain the IP addresses of the TLD name servers for the TLD of the requested domain name in the DNS request; and
  sending the IP addresses to the requesting device.

2. The computer-implemented method of claim 1, further comprising establishing a secure tunnel between the ISP DNS resolver and the one or more known remote name servers prior to sending the DNS request to the one or more known remote name servers.

3. The computer-implemented method of claim 2, further comprising:
  receiving a master file of DNS records from the one or more known remote name servers via the secure tunnel; and
  storing the master file of DNS records within the server within the ISP DNS resolver.

4. The computer-implemented method of claim 2, further comprising:
  periodically receiving updates via the secure tunnel from the one or more known remote name servers to update DNS records; and
  storing the updates in a master file of DNS records within the server within the ISP DNS resolver.

5. The computer-implemented method of claim 1, wherein the DNS services comprise:
  searching a local server to obtain the IP addresses of the TLD name servers for the TLD of the requested domain; and
  returning the IP addresses to the requesting device.

6. The computer-implemented method of claim 5, wherein the search is a recursive search.

7. A non-transitory computer readable medium storing instructions for operating an internet service provider (ISP) domain name server (DNS) resolver, that when executed by one or more processors, cause the one or more processors to perform operations comprising:
  receiving, via a communication port, a DNS request;
  querying, by one or more computing devices of the ISP DNS resolver, a local cache of the ISP DNS resolver to determine whether information stored by the local cache is sufficient to resolve the DNS request;
  if the information stored is sufficient to resolve the DNS request:
    extracting internet protocol (IP) addresses of top level domain (TLD) name servers of a TLD of a requested domain name from the DNS request from the local cache; and
    returning the IP addresses to a requesting device;
  if the information stored is not sufficient to resolve the DNS request:
    sending the DNS request to a second local cache, a local resolver, or a server of the ISP DNS resolver to perform DNS services locally; and
    after sending the DNS request to the second local cache, the local resolver, or the server within the ISP DNS resolver, intercepting the DNS request, ending local processes from locally resolving the DNS request, and sending the DNS request to one or more known remote name servers to obtain the IP addresses of the TLD name servers for the TLD of the requested domain name in the DNS request; and
    sending the IP addresses to the requesting device.

8. The non-transitory computer readable medium of claim 7, wherein the operations further comprise establishing a secure tunnel between the ISP DNS resolver and the one or more known remote name servers prior to sending the DNS request to the one or more known remote name servers.

9. The non-transitory computer readable medium of claim 8, wherein the operations further comprise:
  receiving a master file of DNS records from the one or more known remote name servers via the secure tunnel; and
  storing the master file of DNS records within the server within the ISP DNS resolver.

10. The non-transitory computer readable medium of claim 8, wherein the operations further comprise:
  periodically receiving updates via the secure tunnel from the one or more known remote name servers to update DNS records; and
  storing the updates in a master file of DNS records within the server within the ISP DNS resolver.

11. The non-transitory computer readable medium of claim 7, wherein the DNS services comprise:
  searching a local server to obtain the IP addresses of the TLD name servers for the TLD of the requested domain; and
  returning the IP addresses to the requesting device.

12. The non-transitory computer readable medium of claim 11, wherein the search is a recursive search.

13. An internet service provider (ISP) domain name server (DNS) resolver comprising:
  a memory storing instructions; and
  one or more processors, coupled to the memory, and configured to process the stored instructions to:
    receive, via a communication port, a DNS request;
    query a local cache of the ISP DNS resolver to determine whether information stored by the local cache is sufficient to resolve the DNS request;
    if the information stored is sufficient to resolve the DNS request:
      extract internet protocol (IP) addresses of top level domain (TLD) name servers of a TLD of a requested domain name from the DNS request from the local cache; and
      return the IP addresses to a requesting device;
    if the information stored is not sufficient to resolve the DNS request:
      send the DNS request to a second local cache, a local resolver, or a server of the ISP DNS resolver to perform DNS services locally; and
      after the DNS request is sent to the second local cache, the local resolver, or the server within the ISP DNS resolver, intercept the DNS request, end local processes from locally resolving the DNS request, and send the DNS request to one or more known remote name servers to obtain the IP addresses of the TLD name servers for the TLD of the requested domain name in the DNS request; and send the IP addresses to the requesting device.

14. The ISP DNS resolver of claim 13, wherein the one or more processors are further configured to establish a secure tunnel between the ISP DNS resolver and the one or more known remote name servers prior to sending the DNS request to the one or more known remote name servers.

15. The ISP DNS resolver of claim 14, wherein the one or more processors are further configured to:

receive a master file of DNS records from the one or more known remote name servers via the secure tunnel; and store the master file of DNS records within the server within the ISP DNS resolver.

16. The ISP DNS resolver of claim 14, wherein the one or more processors are further configured to:

periodically receive updates via the secure tunnel from the one or more known remote name servers to update DNS records; and store the updates in a master file of DNS records within the server within the ISP DNS resolver.

17. The ISP DNS resolver of claim 13, wherein the DNS services comprise:

searching a local server to obtain the IP addresses of the TLD name servers for the TLD of the requested domain; and returning the IP addresses to the requesting device.

\* \* \* \* \*